United States Patent [19]
Moss et al.

[11] Patent Number: 5,315,417
[45] Date of Patent: May 24, 1994

[54] LOW NOISE TRANSMISSION HOLOGRAPHIC OPTICAL ELEMENT

[75] Inventors: Gaylord E. Moss, Marina Del Rey; John E. Wreede, Monrovia, both of Calif.

[73] Assignee: Hughes Aircraft Company, Los Angeles, Calif.

[21] Appl. No.: 967,941

[22] Filed: Oct. 28, 1992

Related U.S. Application Data

[63] Continuation-in-part of Ser. No. 607,384, Oct. 31, 1990, abandoned.

[51] Int. Cl.⁵ .................... G03H 1/02; G03H 1/04; G02B 5/32
[52] U.S. Cl. .................................. 359/3; 359/15; 359/28; 430/1
[58] Field of Search .............. 350/3.61, 3.81; 430/1, 430/2; 359/3, 28, 10, 15

[56] References Cited

U.S. PATENT DOCUMENTS

| | | | |
|---|---|---|---|
| 3,660,090 | 5/1972 | Curran et al. | 430/2 |
| 3,967,963 | 7/1976 | Graube | 350/3.61 |
| 4,022,618 | 5/1977 | Bartolini et al. | 350/3.61 |
| 4,029,507 | 6/1977 | Wehner et al. | 430/2 |
| 4,815,800 | 3/1989 | Chern et al. | 350/3.7 |
| 4,904,554 | 2/1990 | Wreede | 430/2 |
| 4,995,685 | 2/1991 | Armstrong et al. | 359/3 |
| 4,996,120 | 2/1991 | Smothers et al. | 359/3 |
| 5,015,049 | 5/1991 | Chang | 350/3.81 |

*Primary Examiner*—Loha Ben
*Assistant Examiner*—Darryl Collins
*Attorney, Agent, or Firm*—Leonard A. Alkov; W. K. Denson-Low

[57] ABSTRACT

A holographic recording medium is treated to reduce or eliminate unwanted extraneous diffraction in a volume transmission hologram. Surface regions of the medium are desensitized either before or after a holographic recording to reduce the contrast of the holographic fringe pattern along the surfaces, and thereby to eliminate planar phase grating effects. Treatments include applying a burst of gas or vapor to the surface, irradiating the surfaces with highly absorbed incoherent light, thermally treating the recording medium.

26 Claims, 2 Drawing Sheets

LOW NOISE TRANSMISSION HOLOGRAPHIC OPTICAL ELEMENT

This is a continuation-in-part of application Ser. No. 07/607,384, filed Oct. 31, 1990, now abandoned.

BACKGROUND OF THE INVENTION

1. Field of the Invention

This invention relates generally to holograms and hologram recording techniques, and more particularly has reference to reducing the noise and improving the angular sensitivity of a transmission type holographic optical element.

2. Description of the Prior Art

In modern aircraft, both military and commercial, it is important that certain information be clearly and unobtrusively presented to the pilot while he is viewing the outside world. The head-up display (HUD) has been developed for this purpose. It provides a display of alphanumerics, symbology, gun sight reticle (for fighter aircraft) and other information superimposed on the pilot's forward field of view.

In a conventional HUD, the information display is generated on a high-brightness cathode ray tube and then projected through a relay lens system onto a transparent combiner screen. Typically, the combiner is a partially silvered mirror, located between the pilot and the aircraft windscreen. The combiner directs the projected images to the pilot's eyes, while at the same time affording him an unobstructed view of the outside world as seen through the transparent combiner and the windscreen.

More recently, the combiner for a head-up display has included a holographic film. Such a film consists of one or more layers of photoreactive gelatin that have been exposed by a holographic process so as to record a directionally sensitive, reflective-type volume holographic fringe pattern. The holographic film has better reflection and see-through capability than a partially silvered mirror.

There are certain disadvantages, however, to using a reflection hologram in a HUD combiner. Significantly, a reflection hologram combiner often must be positioned very close to the windscreen and very far from the pilot's eyes to achieve the desired field of view. This not only limits the freedom of design choices, but also results in design trade-offs in terms of field of view, since the available space to accommodate a combiner decreases as one moves closer to the aircraft windscreen.

One of the advantages of using a transmission hologram in the optical design would be the ability to move the combiner further from the windscreen and closer to the pilot's eyes. In this location, a combiner of a given size would represent a wider field of view. The results would be increased latitude of HUD design and the ability to produce a HUD with a larger field of view than in comparable instrument with a reflection hologram combiner.

Unfortunately, transmission holograms have not proved successful for use in a head-up display because of the noise produced by diffracted sunlight. When a bright source of diffuse light such as the direct rays of the sun strike a transmission hologram, unwanted light (noise) of high intensity is diffracted and transmitted through the hologram in all direction, reducing image contrast and obscuring the desired informational display.

It would be highly desirable to overcome this problem and remove the restriction on the use of transmission holograms in a head-up display.

SUMMARY OF THE INVENTION

Briefly, and in general terms, the present invention provides a variety of techniques for reducing the noise in a transmission hologram, and which allows the transmission hologram to be used in an application where bright sunlight or other bright sources of diffuse extraneous light might strike the hologram.

The present invention is based upon the recognition that a volume transmission hologram has the properties of both a thick and a thin hologram. The thick transmission hologram is very directionally sensitive and is not adversely affected to any appreciable degree by light sources that do not strike the hologram at the Bragg angle. In contrast, the thin or surface transmission hologram which may indeed be a surface deformation (or surface relief) hologram has little or no directional sensitivity and will diffract and reconstruct light from any incoming angle with high efficiency. In fact, ambient sun light is diffracted very efficiently by such surface transmission holographic effect. The bright sunlight which is much brighter than the displayed source, reduce the contrast and obscure the desired displayed image. These latter diffractions which produce the unwanted noise, make a transmission hologram optical element ill-suited for use in an environment of bright multi-directional light.

The present invention provides a means for removing the thin hologram property of a volume transmission hologram, while at the same time preserving the characteristics of the desired bulk transmission effect, i.e., the directionally sensitive transmissions. To that end, the surface of the hologram can be considered the thin hologram, and this surface can be removed (without creating a new surface) by tapering the fringe contrast so that there is no sharp end to the volume fringe pattern. By removing the hard fringes along the surface, the unwanted thin hologram is substantially eliminated, leaving only the desired thick transmission hologram free of unwanted noise. The result is a volume transmission hologram that is suitable for use in bright sunlight conditions. The specific techniques for implementing the invention are similar for use in bright sunlight conditions. The specific techniques for implementing the invention are similar to ones used to remove unwanted "flare" or ghost images in volume reflection holograms as described in commonly assigned U.S. Pat. No. 4,815,800, entitled FLARE REDUCTION IN HOLOGRAMS.

Specifically, one method involves chemically desensitizing the surface layer of the gelatin with a short burst of gas or vapor that reacts with the light sensitive material in the layer to harden and desensitize that material. As the gas or vapor gradually diffuses into the layer, it produces a gradient of increasing sensitivity. Where the photoreactive layer is dichromated gelatin (e.g., a phase hologram), formaldehyde is a suitable gas; for a silver halide layer (e.g., an amplitude hologram), hydrogen sulfide is effective. Such a procedure is most easily applied to the outer surface of the gelatin layer, i.e., to the surface remote from the substrate. However, techniques of gel transfer have been developed which would allow the gelatin material to be transferred to a new substrate, so that the surfaces could be reversed, and the chemical treatment could then be used to modify the newly exposed surface. This method is most useful where high efficiency holograms are needed.

The preferred method in accordance with the invention involves optically exposing both surfaces of the gelatin, either before or after hologram recording, with incoherent light of a wavelength that is highly absorbed by the gelatin. The light penetrates only a short distance into the material, using up available photoreactive sites and diminishing the ability of the material to record high contrast fringes (or reducing the contrast of previously recorded fringes). The penetrating light develops an absorbance gradient, resulting in a gradual reduction of sensitivity of the recording medium toward the surfaces thus exposed. Absorbance of the incoherent light may be increased by adding, for example, a highly absorbing dye in the UV to the gelatin layer and then exposing the surfaces to UV light. Alternatively, the dichromated gelatin itself may be used as the highly absorbing dye if the proper wavelength (e.g., 3660A) is selected. Such a procedure produces a variation in sensitivity as a function of depth, thereby eliminating all high contrast holographic fringes at the surfaces of the gelatin layer and any surface deformation hologram, while preserving the desired high contrast volume fringes in the interior of the gelatin layer.

Another method involves coating multiple layers of light sensitive material, such as dichromated gelatin, with each layer having a different sensitivity to light. The sensitivity of the recording medium thus can be increased as a function of depth, either step-wise or continuously, depending upon whether diffusion occurs between layers. In accordance with this method, the number of layers may be as few as two or as many as nine or more, to accomplish the desired effect. By using multiple layers, there is either a gradual blurring (lowering of contrast) of the fringes toward the surfaces of the recording medium, or a series of increasingly lower contrast fringes within the respective layers progressing towards the surfaces of the recording medium. In either case, the resultant extraneous diffraction is less than that which would be present with a single high contrast fringe.

The desired multi-layer effect may be achieved by several alternative procedures.

A first procedure involves coating each layer with identical material, but after each layer is coated, all coated layers are exposed to incoherent light. The exposure reduces a layer's sensitivity to coherent light as a function of exposure time. Thus, the first layer coated (the one adjacent the substrate) will have the lowest sensitivity to coherent light; the next layer will have the next lowest sensitivity to light, and so on.

A second procedure uses heat to desensitize the layers as each layer is added. This procedure would produce essentially the same results as the first procedure.

If desired, the outer surfaces of the layers described in the preceding two procedures could be treated in accordance with the chemical desensitization method described above.

A preferred procedure results in improvement at both surfaces of the material and involves varying the inherent light sensitivity of each layer. One way of accomplishing this is to vary the concentration of the sensitizer in each layer, e.g., the dichromate ion in dichromated gelatin or the grain size or concentration in silver halide.

The above-described procedures provide multiple step sensitivity. A fourth procedure provides diffusion between the layers and gives a continuous change in sensitivity. In a three-layer system for this fourth procedure, for example, the inner and outer layers would have no inherent light sensitivity and would gain sensitivity by diffusion of sensitizer from a light sensitive center layer.

The various methods which may be employed in the practice of the present invention all serve to vary the sensitivity of the light sensitive medium as a function of depth, with the result that there is no definite end to a high contrast fringe pattern of a volume transmission hologram recorded in the medium. The effectiveness of a transmission hologram HUD combiner is improved when the holographic film is treated in the manner of the present invention, because the unwanted noise from thin surface gratings are substantially reduced or entirely eliminated.

When similar techniques were first disclosed in the commonly assigned patent mentioned above, their purpose was to address the problem of extraneous diffraction or "flare" in slant fringe volume reflection holograms. The flare was caused by a thin phase grating of relatively low efficiency along the gelatin surface which acted as an unwanted transmission hologram. Rather than passing all the ambient light straight through the combiner like the desired reflection hologram, the unwanted transmission hologram would diffract the ambient light into multiple order, ghost images. For example, a runway light when viewed through a combiner with a volume reflection hologram would appear as a collection of multiple ghost images obscuring the pilot's forward field of view. The problem was solved by using the techniques of tapered fringe contrast to ideally remove the transmission hologram in its entirety from the desired volume reflection hologram.

In contrast, the present invention is addressed to a situation where the desired hologram is a transmission hologram and where certain transmission light is supposed to be diffracted. The problem is to eliminate the unwanted transmission diffraction without diminishing or adversely affecting the desired characteristics of the thick transmission hologram. No technique has heretofore been suggested for achieving that result. The present invention fulfills that need.

These and other objects and advantages of the invention will become apparent from the following more detailed description, when taken in conjunction with the accompanying drawings of illustrative embodiments.

DESCRIPTION OF THE PREFERRED EMBODIMENTS

As shown in the drawings for the purposes of illustration, the invention is embodied in transmission holograms and hologram recording techniques, in which the sensitivity of the photoreactive recording media tapers as a function of depth.

In general, volume holograms are made from a thin layer of photoreactive gelatin which is applied to a glass substrate and exposed to in-phase laser beams of opposite direction(for reflection-type holograms) or similar direction (for transmission-type holograms) that intersect an angle at the gelatin layer. The intersecting beams set up an interference pattern which is recorded as a sinusoidal variation in the index of refraction of the gelatin. A pattern of fringes corresponding to the index modulation defines the recorded hologram. These fringes generally are parallel to the line bisecting the angle between the two recording beams.

In the case of a reflection hologram, the bisector is generally parallel to the surface of the gelatin, so that the resulting fringes also are generally parallel to the surface. In the case of a transmission hologram, on the other hand, the bisector is generally at a steep angle to the surface, so that the resulting fringes are steeply slanted (sometimes nearly perpendicular and which actually can be perpendicular) and intersect the surface. The steep angle increases the frequency of the index modulation at the surface of the gelatin, resulting in a planar phase grating (described later) of related, high efficiency.

Figure 1A:
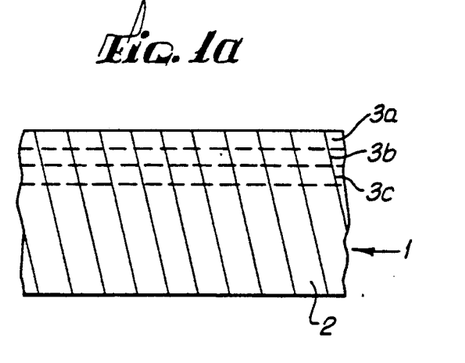
FIGS. 1(a) and 1(b) are, respectively, a fragmentary, schematic, cross-sectional representation of a volume transmission hologram, and an enlarged, fragmentary, cross-sectional representation of a surface region thereof illustrating in schematic form the surface phase grating associated with the volume transmission hologram.

FIG. 1(a) shows a typical volume transmission hologram. The index of refraction varies sinusoidally throughout the depth of the photoreactive recording medium 1, with the fringes 2 representing areas of maximum (or minimum) index of refraction. These fringes define a volume transmission hologram which is very directionally sensitive. Light that strikes the hologram at the so-called design angle is diffracted efficiently, while light that strikes at other angles is diffracted far less efficiently, or in the ideal case, is not diffracted at all.

Figure 1B:
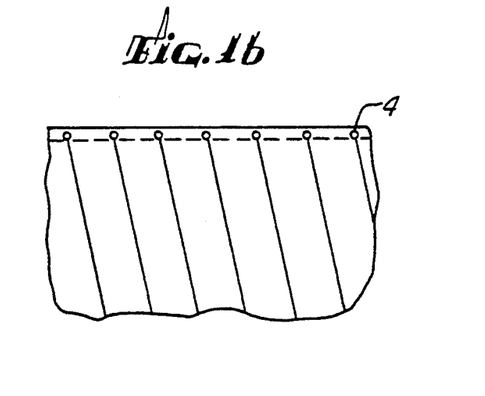

The volume hologram may be visualized as a collection of thin, superimposed sheets, such as 3a, 3b, 3c, etc., in FIG. 1(a), with each sheet having a thickness far less than the wavelength of the hologram construction beams. The periodic variations in the index of refraction in the outermost thin sheet 3a are a result of the high contrast ends of the fringes that define the volume hologram. These ends are represented by the circles 4 in FIG. 1(b). These periodic variations in index of refraction at the surface of the recording layer cause that surface to act as a planar phase grating, (even in the absence of surface deformation). This planar phase grating diffracts design light at the appropriate angle, (i.e., at the same angle as the volume hologram) but also diffracts light from other angles with comparable efficiency. In other words, this surface grating has no angular selectivity. The unwanted noise in a volume transmission hologram is a result of these surface effects.

Figure 2:
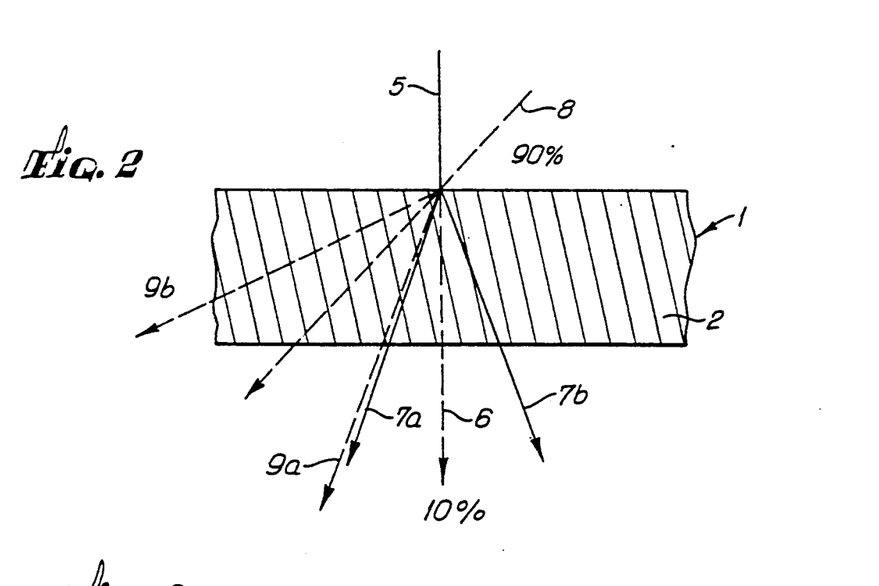
FIG. 2 is a fragmentary, schematic, cross-sectional representation of the transmission hologram of FIG. 1 in the playback mode of operation.

More specifically, as shown in FIG. 2, a volume transmission hologram with fringes 2 will diffract, for example, 90% of incident light at the Bragg angle, and will transmit the remaining 10% of Bragg angle light straight through the hologram without diffraction (as indicated by the dashed line 6 shown in FIG. 2). The diffracted light consists of a high intensity diffraction 7a at the desired angle and direction and a low intensity (nearly invisible) diffraction 7b of equal but opposite angle. Light from all other angles is also transmitted without substantial diffraction. However, the thin phase grating in the surface region of the recording medium 1 acts as an additional transmission hologram which diffracts light efficiently irrespective of its angle of incidence. Thus, for example, incident light 8 from other than the Bragg angle produces extra diffraction beams 9a and 9b of generally equal intensities which can degrade the quality of the desired image display produced by the volume transmission hologram.

In theory, the intensity of the extraneous diffracted beams is proportional to the square of a quantity equal to the effective thickness of the thin surface grating multiplied by delta n, the difference between the maximum and minimum indices of refraction in the hologram. Thus, the intensity of these extraneous diffracted beams theoretically could be reduced by reducing either delta n or the effective thickness. Reducing the effective thickness of the grating is not a practical solution because the thickness of a gelatin layer is difficult to control. Delta n can be controlled, but if it is reduced throughout the volume of the hologram, the overall efficiency of the desired volume hologram also will be reduced. The present invention seeks to preserve the efficiency of the desired volume transmission hologram, while eliminating the surface phase grating effect only at surface regions of the gelatin layer.

The present invention is based upon the theory that a gradual interface boundary along the surface regions of the recording medium will reduce the diffractive power in those regions. The gradual interface can be visualized as the collection of thin, superimposed sheets, described earlier, in which the amplitude of modulation in the index of refraction within any given sheet is incrementally lower than in the next adjacent sheet toward the surface of the medium. For example, if the refractive index modulation in the volume hologram was 0.1, the index modulation in the innermost thin sheet could be 0.09, the index modulation in the next thin sheet could be 0.08, and so on, with the index modulation in the outermost thin sheet being essentially zero. The diffracted beams produced by the surface region would then have an intensity equal to the sum of the intensities contributed by the individual thin sheets in that region. Intensity can be defined as:

$$I \sim \Delta n^2 t$$

where
- I is intensity,
- $\Delta n$ is the difference between the minimum and maximum index of refraction in a thin sheet, and
- t is the thickness of a thin sheet.

Hence, it will be appreciated that the intensity of the diffracted beam produced by a collection of thin sheets having decreasing $\Delta n$ will be far less than the intensity of a beam produced by a surface region having a uniform $\Delta n$ equal to the $\Delta n$ of the volume hologram. The gradual boundary thus reduces the intensity of the extra diffracted beam to a level at which it becomes insignificant.

This gradual boundary concept can be implemented in various ways within the scope of the present invention. The commonly assigned patent cited above disclosed a number of techniques for removing the surface hologram from a slant fringe reflection hologram. These techniques can be adapted to the present invention. There are several different procedures, all of which result in a tapering of sensitivity of the photosensitive film as a function of depth. Upon holographic exposure and processing, the resultant fringes vary as a function of depth with essentially no holographic action at the surface and no surface hologram.

Figure 3A:
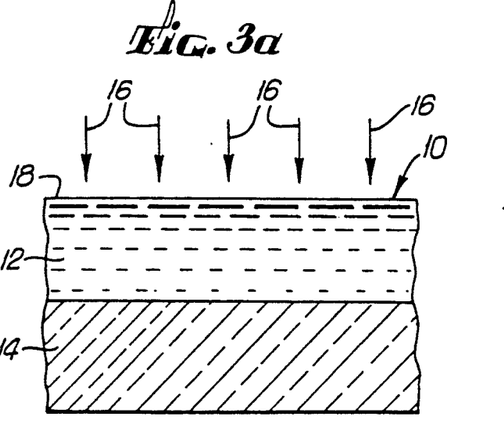
FIGS. 3(a) and 3(b) are, respectively, a fragmentary, schematic, cross-sectional representation of a hologram recording structure illustrating one particular method of the present invention, and a graphical representation of the sensitivity profile of a hologram made in accordance with that method.

FIG. 3(a) schematically represents a portion of a holographic structure 10 comprising a layer 12 of holographic recording medium, typically dichromated gelatin, on a support structure 14, typically a glass plate. The gelatin layer 12 is treated with a short burst of gas or vapor, represented by the arrows 16. This gas or vapor reacts with the light sensitive material in the layer 12 along the upper surface 18, and gradually diffuses into the layer 12 to a limited extent.

Figure 3B:
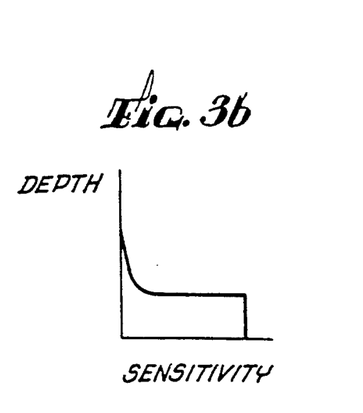

In one particular embodiment, a 0.010 inch layer 12 of dichromated gelatin solution (20 m molar dichromate—8% gelatin) is coated onto the substrate 14. It is allowed to gel at 5° C. and partially dried. A short burst (<10 seconds) of acetaldehyde vapor at near atmospheric pressure is passed over the gel. The outer layer of dichromate is reduced by the aldehyde and loses its light sensitivity. During the short time period of exposure to the vapor, the aldehyde also diffuses slightly into the interior of the gel, causing diminishing reduction in the light sensitivity of the portion of the layer adjacent the surface region and a physical hardening of the surface. FIG. 3(b) shows the resulting sensitivity profile for the layer 12 after treatment. At the upper surface 18, the sensitivity is essentially zero. It then increases with increasing depth, until a level corresponding to the normal untreated sensitivity of the layer is reached.

The foregoing procedure reduces fringe contrast at the outer surface 18 of the layer, and to a lesser extent, to the depth that the aldehyde penetrates. However, to treat the inner surface of the layer, the gelatin may be coated loosely onto the substrate 14, so that it can be removed, turned over, and attached to another substrate at the already treated surface layer 18. The aldehyde vapor process shown in FIG. 3(a) is then repeated to desensitize the newly exposed surface. As an alternative procedure, the gas treatment can be applied to the outer surface of a hologram made in accordance with the multiple layer techniques described below with references to FIGS. 5(a) and 5(b).

A suitable method for gel transfer is to coat the layer 12 onto a substrate which is lightly spread with a mold release, transfer by adhering the gelatin to a second substrate with an optical adhesive such as Norland 61 (which is cured by ultraviolet light), and then popping the gelatin loose from the first substrate. An alternative approach is to use a thermal setting epoxy, such as Epotech 302-3, which does not require ultraviolet light for curing and thus avoids any possible reaction in the gelatin from the ultraviolet light. Still another method of gel transfer involves coating the gelatin onto partially hardened Noland 61 on a glass substrate. The gelatin then can be released from the Norland 61 by heating at 70°-70° C. for a few minutes.

Figure 4A:
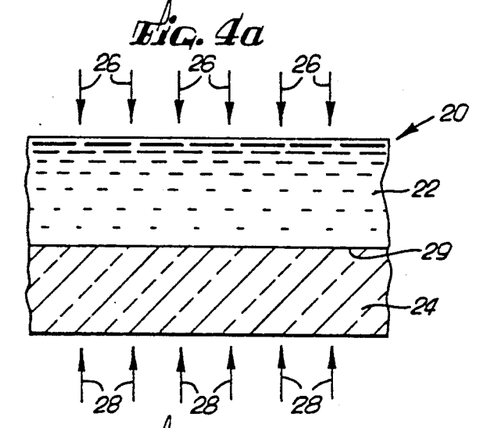
FIGS. 4(a) and 4(b) are, respectively, a fragmentary, schematic, cross-sectional representation of a hologram recording structure illustrating a second method of the invention, and a graphical representation of the sensitivity profile of a hologram made in accordance with that method.

FIG. 4(a) schematically represents a portion of a holographic structure 20 comprising a layer 22 of holographic recording medium, typically dichromated gelatin, applied to a support material 24, such as a glass plate. The layer 22 is optically exposed to incoherent light, as indicated by the arrows 26, 28. The light originates from incoherent light source positioned on opposite sides of the structure 20, the light from the substrate side, as indicated by arrows 28, reaching the inner surface 29 of the layer 22 through the glass plate 24. The wavelength of the incoherent light is selected to penetrate only a short distance into the recording material 22. A dye (not shown) may be included in the layer 22 to increase the light absorbance.

In one particular embodiment, a dichromated gelatin layer (approximately 14 microns thick with $3 \times 10^{17}$ molecules dichromated per $cm^2$) is exposed on both sides to incoherent light from a filtered mercury arc lamp. This exposure may occur either before or after the layer 22 has been exposed to the coherent light used for the hologram construction beams (typically 5145 Angstroms). The incoherent illuminating is typically within the range of 000–5000 Angstroms, preferably 3660 Angstroms, and within a range from 70 to 420 millijoules per $cm^2$. The optical absorbance of the layer at 3660 Angstroms is 5.2, and at 5145 Angstroms it is 0.06. The 3660 Angstrom energy is reduced to 5% of the incident level within 3.2 microns of the incident surface. Thus, the unreacted dichromated gelatin available for subsequent hologram exposure at 5145 Angstroms is approximately 8 microns or less with a gradual lowering of sensitivity over the outer 3.2 microns. The undesired surface grating typically is about 0.2 microns thick, and the brightness of the extraneous diffraction can be substantially reduced if the fringe edge is blurred over a depth greater than about 0.1 microns from the surface of the recording medium. The present technique exceeds that requirement.

Figure 4B:
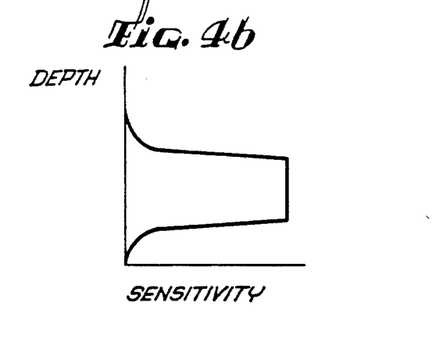

FIG. 4(b) shows the sensitivity profile for the layer 22 after treatment in the manner described above. It shows a substantial reduction in sensitivity in the outer three microns on each side of the eight micron central region.

Figure 5A:
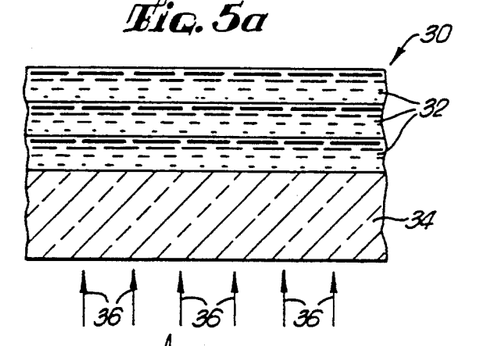
FIGS. 5(a) and 5(b) are, respectively, a fragmentary, schematic, cross-sectional representation of a hologram recording structure illustrating still another method of the invention, and a graphical representation of the sensitivity profile of a hologram made in accordance with that method.
Figure 5B:
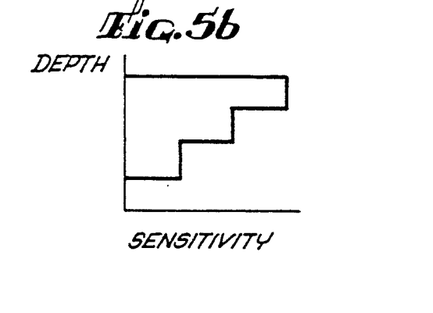

FIG. 5(a) schematically represents a portion of a holographic structure 30 having multiple layers 32 of recording medium mounted on a support structure 34. Each layer 32 has a different sensitivity to light and the layers are arranged so that the overall sensitivity of the recording medium varies as a function of depth. For the structure 30 shown in FIG. 5(a), the reduction in sensitivity occurs as a step-wise function. The sensitivity profile is shown in FIG. 5(b). The sensitivity can be varied in a continuous fashion if diffusion is permitted to occur between the layers 32.

Although three layers 32 are shown in FIG. 5(a), as many as nine or more layers can be provided in order to develop a desired sensitivity profile. By using multiple layers 32, there is either a gradual blurring of the fringes toward the outer surface, or a series of increasingly lower contrast regions as defined by the respective layers 32 progressing toward the outer surface. In either case, the extraneous diffraction will be reduced below the level that would occur in the case of a single high contrast fringe pattern at the outer surface.

In a first procedure for forming the hologram 30 of FIG. 5(a), each of the three layers 32 is formed by laying down a 0.005 inch coating of dichromated gelatin (0.020 m ammonium dichromate—8% gelatin). Each layer is fully dried for approximately six hours at room temperature and then baked for 5-10 minutes at 50° C. before the next layer is laid down. As each layer is added, it is exposed to fluorescent light with 200 millijoules of energy. The fluorescent light is directed at the layers 32 through the support member 34, as indicated by arrows 36. After all the layers 32 have been applied, the recording medium then is exposed to the coherent light which develops the holographic fringe pattern in the medium. With this embodiment, the best theoretical improvement in the reduction of extraneous diffraction is only about 50%, because only one end of the high contrast fringe, i.e., the end adjacent the support member 34, is lowered in contrast. Hence, this procedure has limited utility and is not preferred.

In a variation of that procedure, desensitization is achieved thermally rather than with fluorescent light exposure. In this procedure, preparation of the layers is the same as previously described, except that the baking time for each layer is extended to 20 minutes at 50° C. The sensitivity profile of FIG. 5(b) also is applicable to this procedure. The hardening effect caused by the baking of the layers is additive as additional layers are processed.

Figure 6A:
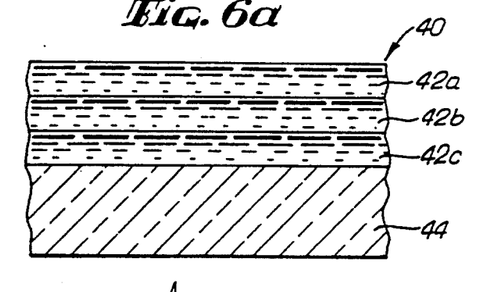
FIGS. 6(a) and 6(b) are, respectively, a fragmentary, schematic, cross-sectional representation of a hologram recording structure illustrating yet another method of the invention, and a graphical representation of the sensitivity profile of a hologram made in accordance with that method.

FIG. 6(a) schematically represents a portion of a holographic structure 40 having a plurality of individual sub-layers 42a, 42b, 42c forming a recording medium on a support material 44. Three sub-layers are shown in FIG. 6(a); up to nine or more layers may be provided. In one embodiment, three separate layers, each constituting a 0.005 inch thick coating of dichromated gelatin solution (dry thickness approximately 7 microns—variable ammonium dichromate—8% gelatin), is coated onto the substrate 44. Each layer is fully dried and baked for 5-10 minutes at 50° C. before the next layer is laid down. The two outer layers 42a, 42c have a diluted dichromate concentration (e.g., 10 m molar for three layers; 0 m molar for nine layers) while the center layer 42b has a standard 20 m molar concentration of ammonium dichromate. Intermediate layers in alternative embodiments are diluted to a concentration level halfway between the concentration levels in the immediately adjacent layers. The optical sensitivity of a layer is related to its dichromate concentration.

Figure 6B:
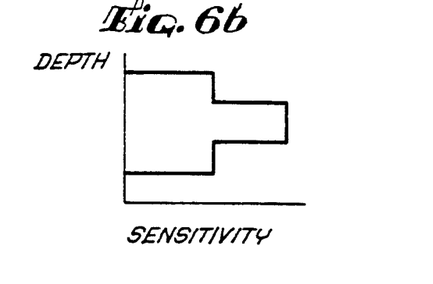

FIG. 6(b) shows the sensitivity profile for the three-layer configuration of FIG. 6(a). It demonstrates that the fringes are reduced in contrast at the substrate interface and at the outer surface of the recording medium.

Figure 7A:
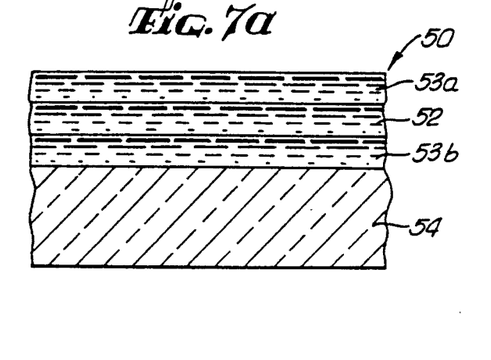
FIGS. 7(a) and 7(b) are, respectively, a fragmentary, schematic, cross-sectional representation of a hologram recording structure illustrating a further method of the invention, and a graphical representation of the sensitivity profile of a hologram made in accordance with that method.
Figure 7B:
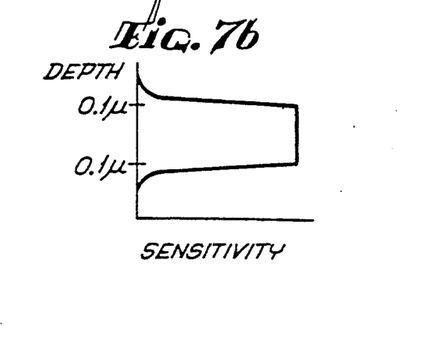

FIG. 7(a) schematically represents a portion of a holographic structure 50 in which the recording medium has a layer of dichromated gelatin 52 sandwiched between layers 53a, 53b of plain gelatin. The entire gelatin structure is applied to a support material 54. In the formation of the structure 50, a layer of plain gelatin solution (8% gelatin—no dichromate) with a thickness of 0.005 inch is coated onto a glass plate 54. This layer is allowed to gel at 5° C. and to dry slightly. Then, a 0.010 inch thick layer 52 of dichromate gelatin solution (8% gelatin—0.020 m ammonium dichromate) is laid over the previously deposited layer 53b. This new layer is then allowed to gel and dry partially. The third layer 53a with no dichromate is then applied on the dichromate layer 52 to a thickness of 0.005 inch. After this third layer is jelled, all three layers are dried to the level needed for holographic exposure. As a result of this process, the interfaces between the dichromate layers and plain gelatin layers become minute diffusion areas in which the dichromate of the center layer 52 diffuses outwardly into the surface regions of the outer layers 53a, 53b. These interfaces have a thickness slightly in excess of 0.1 micron, which is effective to reduce the unwanted diffraction caused by the surface grating. The resultant sensitivity profile is shown in FIG. 7(b). This figure shows essentially zero sensitivity for the plain gelatin layers 53a,53b, normal sensitivity for the dichromated gelatin layer 52, and steep sloped sides transitioning between the plain and dichromated layers, corresponding to the diffusion areas along the interface regions.

These multiple layer techniques are particularly useful where it is desired to have precision control over hologram thickness.

Although the diffusion technique has been discussed only with reference to the structure of FIG. 7(a), it will be appreciated that it is equally applicable to the structures of FIGS. 5(a) and 6(a), and to other similar structures.

From the foregoing, it will be appreciated that the hologram and hologram construction techniques of the present invention significantly alleviate the problem of extraneous diffraction in volume transmission holograms. Each of the disclosed procedures modifies the contrast of the fringe pattern at the boundary of the holographic medium, and thereby avoids the thin surface phase grating effect which otherwise would be present. By eliminating or substantially reducing this fringe contrast at these surface regions, the unwanted extraneous diffraction is effectively reduced or eliminated, while at the same time, the desired high efficiency of the volume transmission hologram in the interior of the holographic medium is preserved. This makes the hologram usable in conditions of bright sunlight.

While several particular forms of the invention have been illustrated and described, it will be apparent that various modifications can be made without departing from the spirit and scope of the invention.

What is claimed is:

1. A method for reducing extraneous diffraction due to surface effects in volume transmission holograms, comprising:

applying a layer of light sensitive holographic recording medium to a substrate;

treating said layer to reduce light sensitivity at and adjacent surface regions thereof; and exposing said recording medium to coherent light so as to strike said light sensitive holographic material symmetrically to record a volume transmission hologram therein with fringes perpendicular to said surface regions.

2. The method of claim 1, wherein said treating step comprise applying a burst of vaporous substance to an outer surface of the said recording medium and diffusing said substance into said medium for a limited distance.

3. The method of claim 2, wherein said recording medium is dichromated gelatin and said substance is formaldehyde.

4. The method of claim 2, wherein said recording medium is dichromated gelatin and said substance is acetaldehyde vapor at near atmospheric pressure, and wherein said applying step comprises passing said acetaldehyde over said gelatin for a period of about ten seconds.

5. The method of claim 2, further including the steps of removing said recording medium from said substrate, turning over said recording medium, re-applying said recording medium to a substrate, and applying a burst of vaporous substance to a newly exposed surface of said recording medium.

6. The method of claim 1, wherein said treating step comprises exposing surfaces of said recording medium to highly absorbed incoherent light.

7. The method of claim 6, wherein said holographic medium is dichromated gelatin and said incoherent light is at a wavelength of approximately 3660 Angstroms.

8. The method of claim 7, wherein said step of exposing said medium to incoherent light is performed prior to said exposing of said medium to coherent light.

9. The method of claim 7, wherein said step of exposing said medium to incoherent light is performed after said exposing of said medium to coherent light.

10. The method claim 6, wherein said region affected by the incoherent light in excess of about 0.1 microns from said exposed surfaces.

11. The method of claim 6, wherein said recording medium includes dye which promotes absorbance of said incoherent light.

12. The method of claim 1, wherein said treating step comprises laying down plural layers of dichromated gelatin in succession to form said recording medium.

13. The method of claim 12, further comprising exposing said recording medium to incoherent light after laying down each layer.

14. The method of claim 12, further comprising heat treating said recording medium after laying down each layer.

15. The method of claim 13, further comprising applying a burst of vaporous substance to an outer surface of said recording medium and diffusing said substance into said medium for a limited distance to reduce light sensitivity thereof.

16. The method of claim 14, further comprising applying a burst of vaporous substance to an outer surface of said recording medium and diffusing said substance into said medium for a limited distance to reduce light sensitivity thereof.

17. The method of claim 1, wherein said treating step comprises applying at least one non-photosensitive material layer to said substrate, applying a light sensitive material layer along an outer surface of said non-photosensitive material layer, and applying a subsequent non-photosensitive material layer onto an outer surface of said light sensitive material layer, such that diffusion of light sensitive material occurs along interface boundaries between said light sensitive material layer and said non-photosensitive material layers to a thickness of at least 0.1 microns.

18. The method of claim 1, wherein said surface regions comprise regions adjacent opposed inner and outer surfaces of said recording medium.

19. A volume transmission hologram comprising:
a substrate;
a layer of holographic recording medium mounted on said substrate, said layer having a volume transmission hologram recorded therein with fringes perpendicular to surface regions of said layer, said hologram adjacent surface regions of said recording medium being substantially reduced in contrast from said holograms in the interior of said recording medium.

20. The hologram of claim 19, wherein said surface regions comprise regions adjacent opposed inner and outer surfaces of said recording medium.

21. The hologram of claim 19, wherein said layer of said holographic recording medium comprises a plurality of layers having differing degrees of light sensitivity.

22. The hologram of claim 21, wherein said plurality of layers comprises at least one layer of light sensitive material sandwiched between layers of non-photosensitive material, interface regions between said light sensitive layer and said non-photosensitive layers comprising diffusion regions of reduced light sensitivity.

23. The hologram of claim 22, wherein said diffusion regions exceed 0.1 microns in thickness.

24. A method for reducing extraneous diffraction due to surface effects in volume transmission holograms, comprising:
applying a layer of light sensitive holographic recording medium to a substrate;
treating said layer to reduce light sensitivity adjacent surface regions thereof; and
exposing said recording medium to coherent light so as to strike said light sensitive holographic recording medium symmetrically to record a volume transmission hologram therein, with fringes perpendicular to said surface regions said treating step comprising applying a first layer of light sensitive material along said substrate, applying an inner layer of light sensitive material over said first layer and applying a second layers having less light sensitivity than said inner layer.

25. A volume transmission hologram, comprising:
a substrate;
a layer of holographic recording medium mounted on said substrate, said layer having a volume hologram recorded therein with fringes perpendicular to surface regions of said layer, the portion of the said hologram adjacent surface regions of said medium being substantially reduced in contrast from the portions of the hologram in the interior of said holographic recording medium, said surface regions comprising regions adjacent opposed inner and outer surfaces of said holographic recording medium.

26. A method for reducing extraneous diffraction due to surface effects in volume transmission holograms, comprising:
applying a layer of light sensitive holographic recording medium to a substrate;

treating said layer to reduce light sensitivity adjacent opposed surface regions thereof; and exposing said recording medium to coherent light so as to strike said light sensitive holographic recording medium symmetrically to record a volume transmission hologram therein with fringes perpendicular to said surface regions, wherein said treating step comprises separately exposing said opposed surface regions to highly absorbed incoherent light.

* * * * *

UNITED STATES PATENT AND TRADEMARK OFFICE
CERTIFICATE OF CORRECTION

PATENT NO. : 5,315,417
DATED : May 24, 1994
INVENTOR(S) : Gaylord E. Moss et al.

It is certified that error appears in the above-identified patent and that said Letters Patent is hereby corrected as shown below:

Claim 24, Column 12, line 49, immediately following "second" insert therefor -- layer of light sensitive material over said inner layer, said first and second --.

Signed and Sealed this

Thirteenth Day of December, 1994

Attest:

BRUCE LEHMAN

Attesting Officer     Commissioner of Patents and Trademarks